US012658717B2

(12) United States Patent
Abdelhakim et al.

(10) Patent No.: US 12,658,717 B2
(45) Date of Patent: Jun. 16, 2026

(54) VEHICULAR POWER SUPPLY SYSTEM WITH A SUPER CAPACITOR ARRANGED IN PARALLEL WITH A BATTERY UNIT FOR MANAGING PEAK CURRENTS

(71) Applicant: ABB Schweiz AG, Baden (CH)

(72) Inventors: Ahmed Abdelhakim, Västerås (SE);
Frans Dijkhuizen, Skultuna (SE)

(73) Assignee: ABB Schweiz AG, Baden (CH)

( * ) Notice: Subject to any disclaimer, the term of this patent is extended or adjusted under 35 U.S.C. 154(b) by 834 days.

(21) Appl. No.: 17/756,546

(22) PCT Filed: Dec. 5, 2019

(86) PCT No.: PCT/EP2019/083917
§ 371 (c)(1),
(2) Date: May 26, 2022

(87) PCT Pub. No.: WO2021/110276
PCT Pub. Date: Jun. 10, 2021

(65) Prior Publication Data
US 2022/0416564 A1 Dec. 29, 2022

(51) Int. Cl.
*H02J 7/34* (2006.01)
*B60L 50/60* (2019.01)
(Continued)

(52) U.S. Cl.
CPC .............. *H02J 7/345* (2013.01); *B60L 50/66* (2019.02); *H02J 7/62* (2026.01); *H02J 7/663* (2026.01); *H02J 7/855* (2026.01)

(58) Field of Classification Search
CPC ...................................................... H02J 7/345
(Continued)

(56) References Cited

U.S. PATENT DOCUMENTS 9,018,922 B2 * 4/2015 Morita ..................... H02J 7/00
320/167
2002/0158513 A1 10/2002 Amano et al.
(Continued)

FOREIGN PATENT DOCUMENTS

CN 203607887 U 5/2014
EP 2 367 261 * 9/2011
(Continued)

OTHER PUBLICATIONS

International Search Report and Written Opinion of the International Searching Authority; Application No. PCT/EP2019/083917; Completed: Feb. 18, 2020; Mailing Date: Feb. 26, 2020; 12 Pages.
(Continued)

*Primary Examiner* — Yalkew Fantu
(74) *Attorney, Agent, or Firm* — Whitmyer IP Group LLC

(57) ABSTRACT

A vehicular power system includes a battery branch including a battery unit arranged in series with a diode, and a high-capacity unit having a maximum voltage that exceeds a nominal voltage of the battery unit. The battery branch and high-capacity unit are arranged in parallel, to feed a load side of the vehicular power system. The battery branch further includes a switching arrangement configured to disconnect the battery unit in response to excessive load-side current. The switching arrangement may allow the high-capacity unit to inject current into the load side at a voltage less than the nominal voltage of the battery unit and/or may allow the high-capacity unit to absorb regenerated current from the load side at a voltage which is greater than the nominal voltage of the battery unit.

17 Claims, 2 Drawing Sheets

(51) Int. Cl.
    *H02J 7/00*        (2006.01)
    *H02J 7/60*        (2026.01)
    *H02J 7/62*        (2026.01)

(58) Field of Classification Search
    USPC ......................................................... 320/109
    See application file for complete search history.

(56)                 References Cited

U.S. PATENT DOCUMENTS

2019/0393696 A1*  12/2019  Tada ................... H01M 50/583
2020/0259353 A1*   8/2020  Kirchner ............. H02J 7/00309
2022/0385080 A1*  12/2022  Bijlenga ............... H01M 50/51

FOREIGN PATENT DOCUMENTS

EP       2367261 A2    9/2011
EP       2367261 A3    9/2014
JP       2-367-261   *  9/2011

OTHER PUBLICATIONS

1 Chinese Office Action; Application No. 2019801027318; Completed: Mar. 8, 2025; 10 Pages.

* cited by examiner

VEHICULAR POWER SUPPLY SYSTEM WITH A SUPER CAPACITOR ARRANGED IN PARALLEL WITH A BATTERY UNIT FOR MANAGING PEAK CURRENTS

TECHNICAL FIELD

The present disclosure relates to the field of electric power supply systems for vehicles, and in particular to a power supply system integrating batteries and at least one super-capacitor.

BACKGROUND

Power supply systems in electric vehicles, including automated guided vehicles (AGVs) and automated mobile robots (AMRs), utilize batteries for powering the different elements or loads within the system. Typically, because a plurality of different voltages is required, the load side may be equipped with a plurality of parallel DC-to-DC converters for supplying power at nominal voltages lower than the battery voltage. The load side may include further converter circuitry for stabilizing the battery voltage. In the example battery-powered power supply system shown in FIG. 1, the battery unit 2 operates at a voltage in the range 20-30 V and is stabilized at 24 V by a boost/buck stage 11, over which the battery unit 2 interfaces with further components of a load side 4. The load side 4 further comprises a direct output of the stabilized battery voltage and three parallel buck stages, collectively referenced by 12, providing respective nominal voltages of 12 V, 5 V and 3.3 V.

Among these different loads, motors are seen to be the main or biggest power consumer, requiring high current and/or high-power during acceleration, which may have short durations such as 1-3 seconds. Most of today's batteries can deliver satisfactory acceleration current but will see their useful lifetime reduced when doing so repeatedly. Over and above that, regenerated power with high current amplitude occurs frequently during braking or deceleration, and this is seen as a significant issue for conventional batteries. Since not all available batteries can absorb currents of high amplitude, braking choppers are utilized to dissipate rather than store the braking energy. The alternative is to use batteries with high-capacity rating for both charging and discharging, which is a costly option.

As a result, some known vehicular power supply systems include supercapacitors (or super-caps) to manage positive and negative power peaks of short duration, e.g., due to acceleration, deceleration or start of different motors. As depicted in FIG. 2, a high-capacity unit 3, such as a super-capacitor, may be connected to the load side 4 over an additional DC-to-DC converter 10. With this additional circuitry, the requirements on the batteries are relaxed, so that cost-efficient batteries with a moderate capacity rating can be used. Since the super-caps absorb the current peaks, the battery lifetime may increase. The additional converter, with several semiconductor components, however, represents an additional cost.

Further solutions according to the state of the art include EP1876669, which discloses vehicular power supply circuitry where a battery is arranged in parallel with an ultracapacitor and in series with a circuit protection module. The circuit protection module is configured to control the cut-off voltage and the impulse current when charging and discharging, and is said to prevent the core of the lithium-ion battery or lithium-polymer battery from being damaged while the circuit is shortened. Yet another solution is known from US2002158513, which discloses a vehicular power supply system where a power capacitor is arranged in parallel with a battery that is connected to a motor via two separate branches that comprises a diode each.

There is a need for a simpler way of integrating the super-cap unit in the vehicular power system, while maintaining all or most of the benefits associated with the known circuitry of FIG. 2.

SUMMARY

It is an object of the invention to propose a vehicular power supply system having a structure for integrating batteries and super-capacitors.

The invention is defined by the independent claims. The dependent claims represent advantageous embodiments of the invention.

A vehicular power system generally includes a battery branch and a high-capacity unit which are arranged in parallel to feed a load side of the vehicular power system. The battery branch includes a battery unit arranged in series with a diode or similar unidirectionally conducting component. The high-capacity unit, which may include one or more super-capacitors, has a design maximum voltage that exceeds the nominal voltage of the battery unit. According to a first aspect of the invention, the battery branch further includes a switching arrangement, which is configured to disconnect the battery unit when a load-side current is excessive.

The power system according to the first aspect may have a simpler structure and/or smaller volume than known systems. The power system may require fewer and simpler components, in particular, fewer semiconductor switches which are relatively costly to purchase. Finally, the power system may be simpler to control and maintain than hitherto known systems.

A second aspect of the invention relates to an electric vehicle comprising a power system with the above characteristics. The electric vehicle may be an AGV or AMR.

The power management of a vehicle according to the second aspect is reduced compared to known vehicles. The manufacturing of the vehicle may be simpler and less vulnerable to component shortages, since more of the necessary components are of a standardized type and can be sourced off-the-shelf to a greater extent.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

Embodiments of the invention will now be described more fully with reference to the accompanying drawings. These embodiments should not be construed as limiting but are provided by way of example so that this disclosure will be thorough and complete, and to fully convey the scope of all aspects of the invention to those skilled in the art.

An embodiment of the invention provides an electric vehicle with a vehicular power supply system 1. The electric vehicle may be a passenger car or utility vehicle of any weight class. The electric vehicle may be either operated by a human driver or have some degree of autonomy, such as an automated guided vehicle (AGV) or an autonomous vehicle (AV). The electric vehicle may furthermore be an automated mobile robot (AMR).

Figures 3, 4, 5:
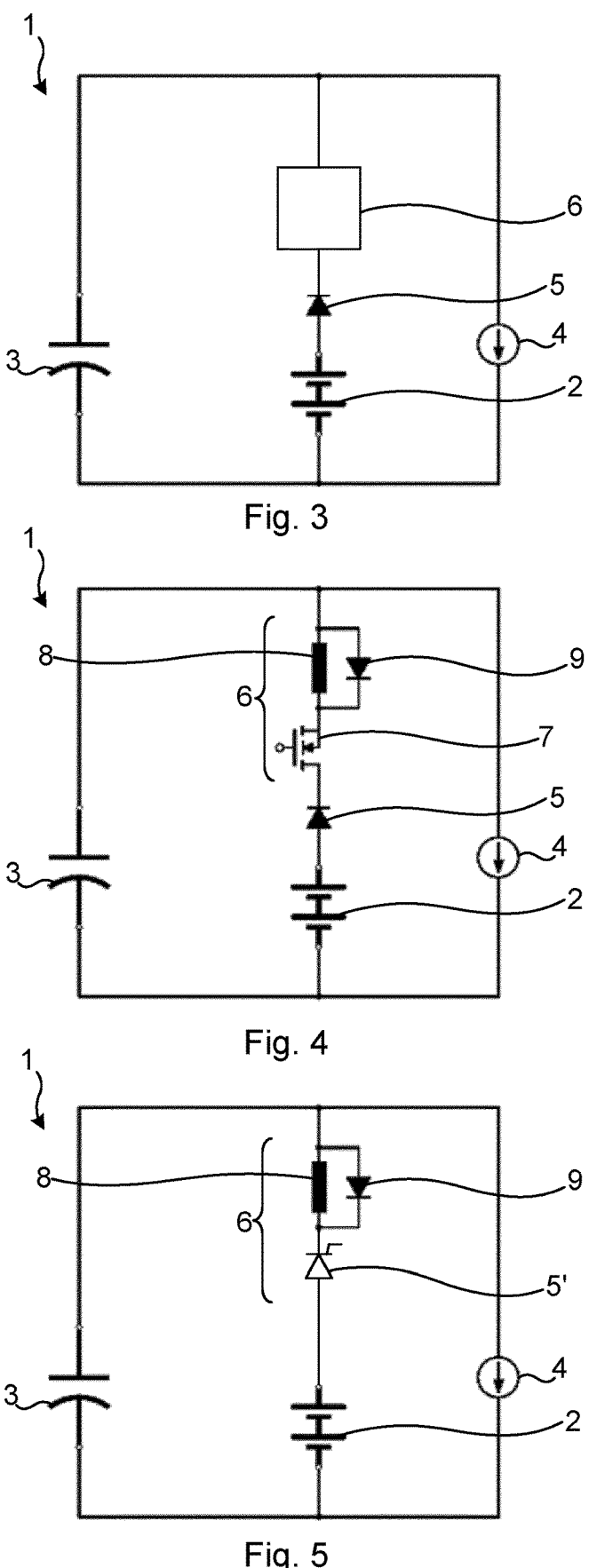
FIGS. 3 to 5 are circuit diagrams of vehicular power systems powered by batteries and integrated super-caps, according to embodiments of the invention.

FIG. 3 is a circuit diagram of a portion of the vehicular power system 1. An energy-source side comprises two parallel branches, located to the left and at the centre of FIG. 3: one branch with a high-capacity unit 3 and one battery branch with a battery unit 2 arranged in series with a diode 5 and a switching arrangement 6. The diode 5 is oriented to be conducting while the battery unit 2 supplies electric energy to the load side 4; the direction of any regenerated current from the load side 4 corresponds to the non-conducting direction of the diode 5. While FIG. 3 shows the switching arrangement 6 located downstream of the diode 5 with respect to the conducting direction of the diode 5, the battery unit 2, diode 5 and switching arrangement 6 can be arranged serially in any sequence without changing the effects discussed herein. Indeed, each of the diode 5 and the switching arrangement 6 serve to interrupt current through the battery unit 2, and this can be achieved by blocking current at any point of the battery branch.

The high-capacity unit 3 may comprise or consist of one or more of the following: a high-capacity capacitor, a super-capacitor (or super-cap), an ultracapacitor, the usage of these terms being overlapping or partially synonymous. As used herein, a super-capacitor is one with relatively high energy storage capacity per unit volume or unit mass; a specific energy of at least 1 mJ/mm$^3$ is preferred. The total energy storage capacity of the super-capacitor may be chosen in accordance with a maximum total kinetic energy of the robot or vehicle. Alternatively, or additionally, a super-capacitor is able to accept and inject current at a higher rate than a conventional rechargeable battery. The battery unit 2 may comprise one or more batteries, such as lead-acid batteries, nickel-metal hydride batteries, molten-salt battery, lithium-ion battery or other batteries suitable for electric vehicle propulsion. Dedicated charging circuitry (not shown) may be included to allow charging of the battery in a mounted state. In an example implementation of the embodiment depicted in FIG. 3, the battery unit 2 has a nominal voltage of 24 V, and the high-capacity unit 3 has an operating range from 12 to 36 V approximately, and allows peak voltages of up to 48 V.

A load side 4 of the vehicular power system 1 corresponds to the righthand branch of the circuit in FIG. 3. As mentioned, because a plurality of different voltages may be required to feed different motors, actuators and other components of the vehicle, the load side 4 may be equipped with a plurality of parallel DC-to-DC converters, similar to the buck converters within 12 of FIG. 1, for supplying voltages lower than the battery voltage (here: 24 V) in addition to the voltage obtained directly from the battery unit 2. In an embodiment, the load side 4 has three or more outputs with different local voltages.

Figure 1:
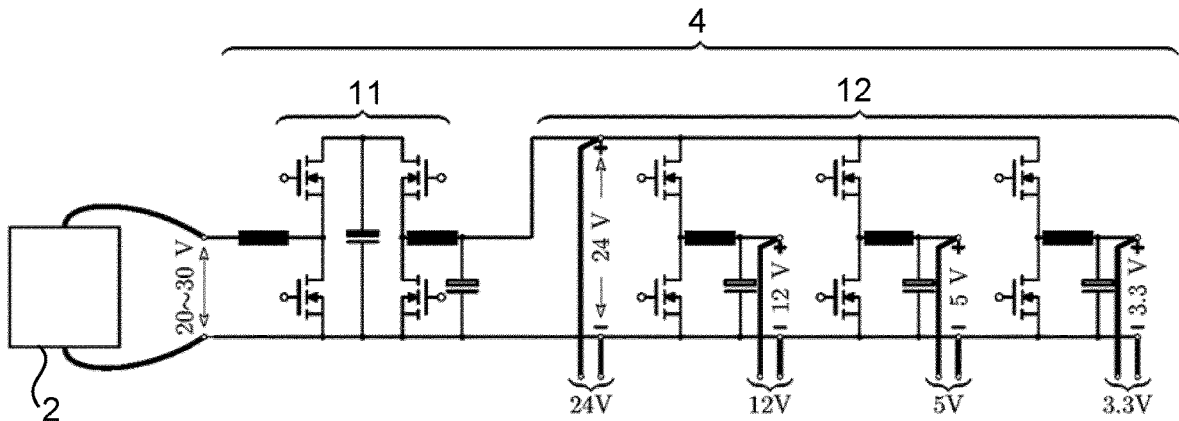
FIG. 1 is a circuit diagram of a battery-powered vehicular power system, including a detailed view of the load side.
Figure 2:
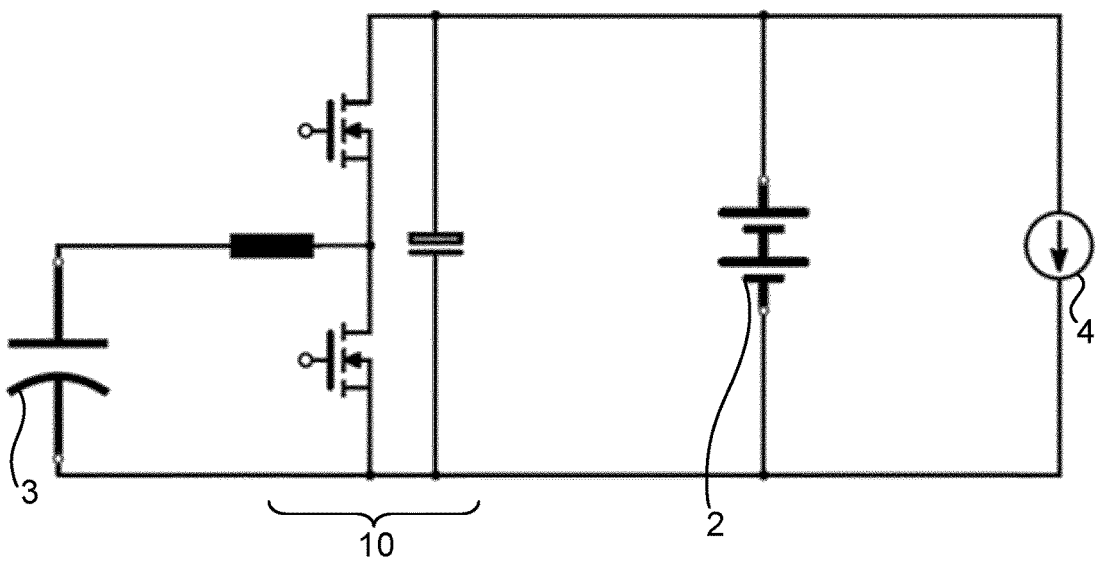
FIG. 2 is a circuit diagram of a battery-powered vehicular power system according to the prior art.

The load side 4 may optionally include further DC-to-DC converter circuitry, similar to the boost/buck converter 11 of FIG. 1, arranged to stabilize the battery voltage. Such further converter circuitry is typically not necessary in a vehicular power system according to the present embodiment, where the high-capacity unit 3 supplements the battery unit 2 in managing peak currents and the switching arrangement 6 provides good controllability of the battery voltage.

Alternatively, the load side 4 may comprise one or more DC-to-AC converters, such as single-phase and three-phase inventers.

The switching arrangement 6 is configured to disconnect the battery unit 2 from the load side 4 in response to excessive load-side current. The switching arrangement 6 effectuates this disconnection by rendering the battery branch non-conducting, such as by opening the branch. As used herein, an "excessive" current is one that exceeds the battery's design current or rated current. It may also be current falling within the range of currents for which the battery is designed but is known to—or can be reasonably expected to—shorten the battery's lifetime. If an indication of the momentary current through the load side 4 is available to the switching arrangement 6, the switching arrangement 6 may monitor the load-side current and decide, on that basis, when to disconnect and re-connect the battery unit 2 from the load side 4. The monitoring may be performed with a predefined period, may be predictive, and/or may be triggered by discoverable driving patterns, such as acceleration and deceleration.

Example implementations of the switching arrangement 6 will be described later with reference to FIGS. 4 and 5. Already with the functional characterization of the switching arrangement 6 given so far, however, the following advantageous effects are obtained. The diode 5 in series with the battery unit 2 stops reverse currents from flowing from the load side 4 into the battery unit 2. This allows the voltage of the high-capacity unit 3 to increase up to 48 V during regenerative braking. Under the action of the diode 5, this stored electric energy is returned to the load side 4 without delay; more precisely, the diode 5 will block the battery unit 2 until the voltage of the high-capacity unit 3 decreases to the battery voltage of 24 V, at which point the high-capacity unit 3 will have delivered 75% of the energy it stored at 48 V. It is noted that the high-capacity unit 3 normally does not supply the voltages in the range from 24 to 48 V directly to the loads on the load side 4, but such voltages are stepped down using the various DC-to-DC converters within the load side 4 that were discussed above.

A further advantageous effect that may be obtained with the invention is the ability to inject current from the high-capacity unit 3 to the load side 4 during acceleration and other episodes when high current is required. Because the switching arrangement 6 is configured to disconnect the battery unit 2 whenever the load-side current exceeds the maximum design current of the battery unit 2 (this is an "excessive" current in the sense described above), the voltage of the high-capacity unit 3 may fall below the voltage of the battery unit 2 while still being used to inject extra current on the load side 4. A still further advantageous effect is the ability to receive regenerated current from the load side 4 and store it in the high-capacity unit 3 during deceleration. Indeed, as yet another consequence of the fact that the switching arrangement 6 is configured to disconnect the battery unit 2 whenever the load-side current exceeds the maximum battery current, the voltage of the high-capacity unit 3 may rise above the voltage of the battery unit 2, so that regenerated current from the load side 4 is absorbed by the high-capacity unit 3. Both effects are achieved by configuring the switching arrangement 6 with a simple control logic: it disconnects the battery unit 2 if the current exceeds a certain value and then reconnects the battery unit 2 if the current falls back below said certain value or the voltage of the high-capacity unit 3 drops to its lower limit. The lower limit may be half of the rated voltage of a super-capacitor in the high-capacity unit 3, or a lower value.

In an example implementation, as illustrated in FIG. 4, the switching arrangement 6 comprises a switch 7 and downstream thereof, in the conducting direction of the diode 5, an inductor 8 arranged in parallel with a flyback diode 9. The inductor 8 serves to limit short-term current through the battery unit 2. The flyback diode 9 allows dissipation of any magnetic energy stored in the inductor 8 when the switch 7 is opened. The switch 7 may be a metal oxide semiconductor field-effect transistor (MOSFET). The operation of the switch 7 may be governed by the following logic: the switch 7 opens if the load-side current exceeds a certain value and, after this, closes again if the load-side current falls back under below said certain value. Said certain value represents an "excessive" load-side current.

In a variation of the embodiment shown in FIG. 5, a thyristor 5' is arranged instead of the diode 5 and the MOSFET. Functionally, the thyristor acts as the diode 5 and switch 7. According to this variation, the switching arrangement 6 further comprises the current-limiting inductor 8 and the flyback diode 9.

The switching arrangement 6 in any of these example implementations may be connected to an output signal from an ammeter measuring the momentary current flowing through the load side 4, based on which the switching arrangement 6 controls the disconnecting faculty. In FIG. 4, the switch 7 is controlled, and in FIG. 5, the thyristor 5' is controlled. Instead of the output signal from an ammeter, the switching arrangement 6 may receive another signal or local voltage that is indicative of the load-side current.

The aspects of the invention have mainly been described with reference to a few embodiments. However, as is readily appreciated by a person skilled in the art, other embodiments than the ones disclosed above are equally possible within the scope of the invention, which is defined by the appended patent claims.

The invention claimed is:

1. A vehicular power system comprising:
   a battery branch including a battery unit arranged in series with a unidirectionally conducting component, and
   a high-capacity unit having a maximum voltage exceeding a nominal voltage of the battery unit,
   wherein the battery branch and the high-capacity unit are arranged in parallel, to feed a load side of the vehicular power system,
   wherein the battery branch comprises a switching arrangement in series with the battery unit, wherein the switching arrangement is configured to disconnect the battery unit in response to excessive load-side current, and
   wherein the unidirectionally conducting component is oriented to be conducting while the battery unit supplies energy to the load side.

2. The vehicular power system of claim 1, wherein the switching arrangement is configured to disconnect the battery unit when a magnitude of the load-side current exceeds a threshold and reconnect when the magnitude falls below the threshold.

3. The vehicular power system of claim 2, wherein the switching arrangement is configured to disconnect the battery unit to facilitate at least one of the following operating conditions:
   a) the high-capacity unit injects current into the load side at a voltage less than the nominal voltage of the battery unit;
   b) the high-capacity unit absorbs regenerated current from the load side at a voltage greater than the nominal voltage of the battery unit.

4. The vehicular power system of claim 2, wherein the switching arrangement comprises a switch, a current-limiting inductor and flyback diode.

5. The vehicular power system of claim 2, wherein the switching arrangement comprises a switch, a current-limiting inductor and the unidirectionally conducting component.

6. The vehicular power system of claim 2, wherein the unidirectionally conducting component is a thyristor.

7. The vehicular power system of claim 2, wherein the high- capacity unit comprises a high-capacity capacitor.

8. The vehicular power system of claim 7, wherein the high-capacity capacitor is a super-capacitor.

9. The vehicular power system of claim 1, wherein the switching arrangement is configured to disconnect the battery unit to facilitate at least one of the following operating conditions:
   a) the high-capacity unit injects current into the load side at a voltage less than the nominal voltage of the battery unit;
   b) the high-capacity unit absorbs regenerated current from the load side at a voltage greater than the nominal voltage of the battery unit.

10. The vehicular power system of claim 1, wherein the switching arrangement comprises a switch, a current-limiting inductor and flyback diode.

11. The vehicular power system of claim 1, wherein the switching arrangement comprises a switch, a current-limiting inductor and the unidirectionally conducting component.

12. The vehicular power system of claim 1, wherein the unidirectionally conducting component is a thyristor.

13. The vehicular power system of claim 1, wherein the high- capacity unit comprises a high-capacity capacitor.

14. The vehicular power system of claim 13, wherein the high- capacity capacitor is a super-capacitor.

15. An electric vehicle comprising a vehicular power system having:
   a battery branch including a battery unit arranged in series with a unidirectionally conducting component, and
   a high-capacity unit having a maximum voltage exceeding a nominal voltage of the battery unit,
   wherein the battery branch and the high-capacity unit are arranged in parallel, to feed a load side of the vehicular power system,
   wherein the battery branch comprises a switching arrangement in series with the battery unit, wherein the switching arrangement is configured to disconnect the battery unit in response to excessive load-side current, and
   wherein the unidirectionally conducting component is oriented to be conducting while the battery unit supplies energy to the load side.

16. The vehicle of claim 15, which is an automated mobile robot or an autonomous guided vehicle.

17. The vehicle of claim 15, wherein the load side comprises at least three outputs with different nominal voltages.

* * * * *